United States Patent [19]

Yokoyama et al.

[11] Patent Number: 4,727,559
[45] Date of Patent: Feb. 23, 1988

[54] WEIGHTED EVENT COUNTING CIRCUIT

[75] Inventors: Shotaro Yokoyama; Takashi Nishibe, both of Yokosuka; Seiichi Isoguchi, Hino, all of Japan

[73] Assignees: Fuji Electric Co., Ltd.; Fuji Electric Corporate Research and Development Ltd.; Konishiroku Photo Industry Co., Ltd., all of Tokyo, Japan

[21] Appl. No.: 822,881

[22] Filed: Jan. 27, 1986

[30] Foreign Application Priority Data

Feb. 1, 1985 [JP] Japan .................. 60-18142

[51] Int. Cl.$^4$ .................. G06F 7/48; G06M 3/08
[52] U.S. Cl. .................. 377/16; 377/13; 377/111; 377/116; 377/47
[58] Field of Search .................. 377/13, 15, 16, 67, 377/111, 116, 39, 47, 48; 307/272 A, 272 R

[56] References Cited

U.S. PATENT DOCUMENTS

| | | | |
|---|---|---|---|
| 2,853,238 | 9/1958 | Johnson | 377/116 |
| 3,020,481 | 2/1962 | Hulst | 377/116 |
| 3,174,106 | 3/1965 | Urban | 377/67 |
| 3,603,810 | 9/1971 | Clayson | 377/116 |
| 3,632,997 | 1/1972 | Froemke | 377/111 |
| 3,720,910 | 3/1973 | McLaughlin | 377/39 |
| 3,867,617 | 2/1975 | Larsen | 377/47 |
| 4,037,085 | 7/1977 | Minorikawa | 377/116 |
| 4,378,505 | 3/1983 | Scavuzzo | 377/116 |
| 4,399,549 | 8/1983 | Srivastava | 377/116 |

Primary Examiner—John S. Heyman
Attorney, Agent, or Firm—James E. Nilles

[57] ABSTRACT

A weighted event counting circuit comprises a cascade connection circuit composed of a plurality of frequency dividing circuit means and a plurality of coincidence detecting circuit means inserted between the frequency dividing circuit means, and input circuit means to supply digital data representing the occurrence of plural events to the coincidence detecting circuit means. The number of occurrence times of the plural events is counted and totalized with weighting.

16 Claims, 13 Drawing Figures

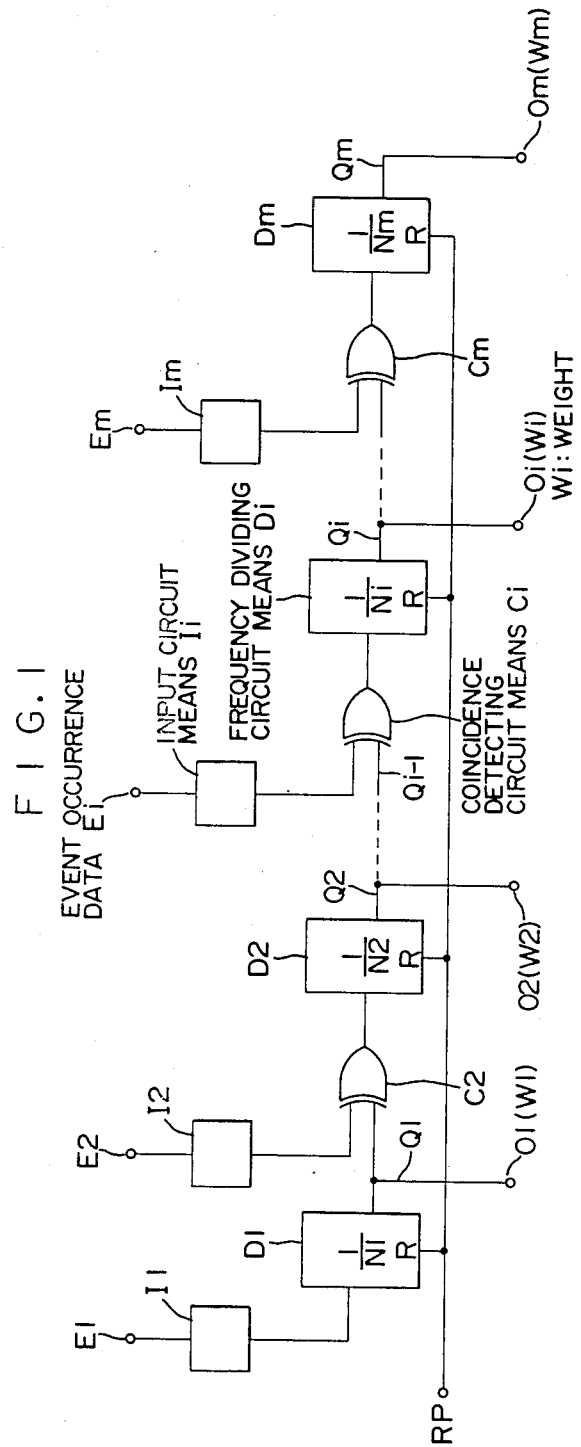
F I G. 1
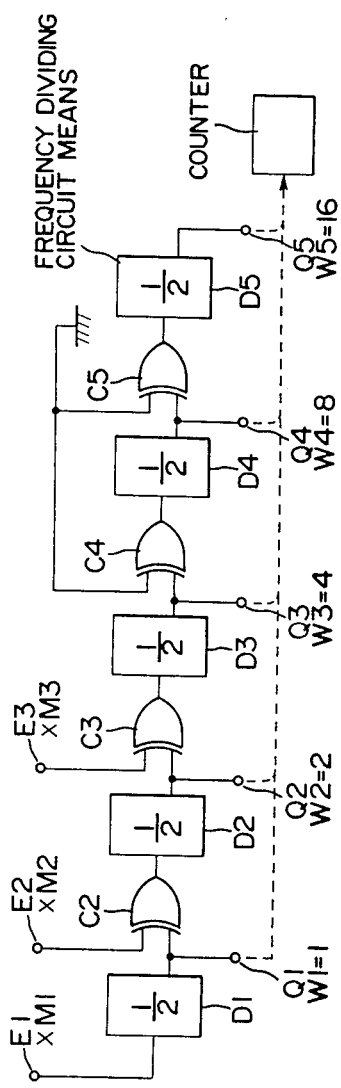
F I G. 2

FIG. 3
| EVENT E | OCCUR-RENCE TIMES M | WEIGHT W | COUNTING OUTPUT | | | | | WEIGHTED OCCURRENCE TIMES |
|---|---|---|---|---|---|---|---|---|
| | | | Q1 (1) | Q2 (2) | Q3 (4) | Q4 (8) | Q5 (16) | |
| E1 | 5 | 1 | 1 | 0 | 1 | 0 | 0 | 5 |
| E2 | 2 | 2 | — | 0 | 1 | 0 | 0 | 4 |
| E3 | 3 | 4 | — | — | 1 | 1 | 0 | 12 |
| TOTAL | — | — | 1 | 0 | 1 | 0 | 1 | 21 |
FIG. 4
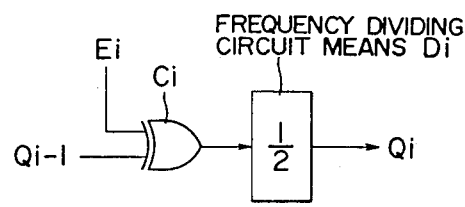
FIG. 6
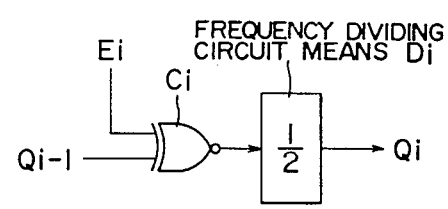
FIG. 5
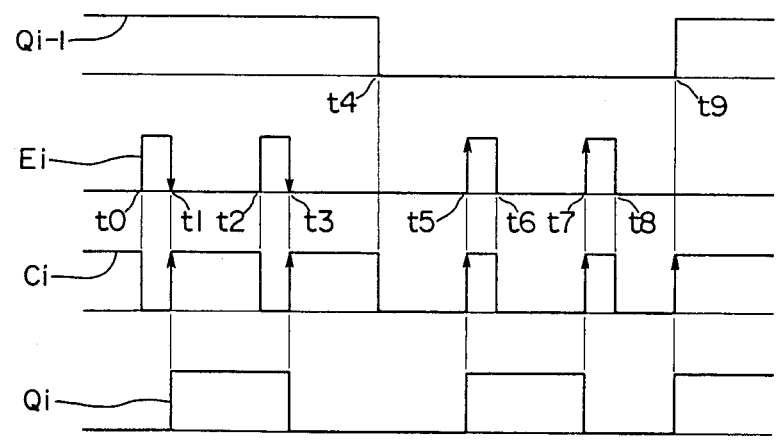

WEIGHTED EVENT COUNTING CIRCUIT

BACKGROUND OF THE INVENTION

1. Field of the Invention

The present invention relates to an electronic circuit which counts and totalizes the number of occurrence times of a plurality of events or the duration thereof with weighting specified per each event.

2. Description of the Prior Art

The plural events are exemplified most simply in troubles produced in various portions within mechanical apparatuses or circuit apparatuses and occurence of causes being liable to introduce troubles. A circuit of the invention may be utilized in a forecast device or a preventive maintenance device which counts the number of occurrence times of these events with weighting corresponding to the importance of the events and totalizes the count value and then generates alarm before producing troubles if the total value becomes abnormally large. However, a weighted counting circuit as object of the invention is required not only in such example but also in various wide applications. As another example, the circuit is required in that the number of singular points or characteristic points in numeral digital data groups, e.g., singular points of observation data groups as object in a pattern recognition apparatus, is totalized with weighting corresponding to characteristics of the singular points and favorable decision is effected. Or, when such digital data groups are produced or generated in pulse form, the pulse width, i.e., the duration is taken as characteristics and the totalized value with weighting corresponding to the degree of characteristics can often provide useful information to know abnormal state or characteristics of such data groups. Irrespective of sorts of various events, whether an event occurs or not is usually given as digital data, particularly one bit data of "0" or "1" being most simple. The circuit of the invention also receives such digital data as signal representing occurrence of an event. If original data is analog value, the data is digitized and then received by the circuit.

A computer or a microcomputer is conventionally used as a weighted counting means having above-mentioned various applications, but it is not always favorable to be assembled in mechanical apparatuses particularly in existing apparatuses from the viewpoint of required space and the price. Consequently, a circuit device of very small type which is more simple and capable of being easily assembled in semiconductor integrated circuit is required. Such circuit of simple and compact constitution is not known well in the prior art, but a counter device of the most simple constitution shown in FIG. 12 may be mentioned first as an example. As clearly understood, signals of pulse form generated every time of occurrence of events E are received at input terminal IN of a binary counter 1 and the pulse number is counted. In another example as shown in FIG. 13, occurrence of plural events $E_1 \sim E_k$ is received through a multi-input OR gate 2 to a binary counter 1 under condition that the plural events do not occur simultaneously, and then the total value of the number of occurrence times is counted. However, any of the conventional examples shown in FIG. 12 and FIG. 13 cannot perform weighting of the importance of the events. In order to perform the weighted counting, plural binary counters 1 of FIG. 12 having the number corresponding to that of the events are arranged and the number of occurrence times is counted per each event, and the count value is read in sequence by a micro processor or the like, and then weighting is performed to respective count values and the totalizing is performed. Consequently, in such means, the circuit is considerably complicated in whole constitution and cannot be easily assembled to a narrow area within the integrated circuit.

SUMMARY OF THE INVENTION

An object of the invention is to provide a weighted event counting circuit wherein occurrence of plural events is counted and totalized with weighting specified per each event using simple constitution.

According to the invention, above object is achieved in a weighted event counting circuit comprising a plurality of frequency dividing circuit means, a plurality of coincidence detecting circuit means each inserted and connected between two of the plural frequency dividing circuit means and having one input to receive output of the front frequency dividing circuit means and supplying its output to the rear frequency dividing circuit, said frequency dividing circuit means and said coincidence detecting circuit means constituting a cascade connection circuit, and input circuit means each supplying other input of the coincidence detecting circuit means with digital data representing occurrence of events to be counted every time the event occurs, wherein the number of occurrence times of plural events is counted and totalized with weighting specified by position which the coincidence detecting circuit to receive digital data representing the occurrence occupies in the cascade connection circuit.

The basic constitution of the circuit of the invention will now be described referring to FIG. 1.

In FIG. 1, frequency dividing circuit means of plural number being m are designated by Di ($i=1\sim m$), and these frequency dividing circuit means Di have frequency dividing ratios $1/N_i$ ($i=1\sim m$) being not equal to each other in general. Of course, it is usually favorable that the frequency dividing ratios are made equal to each other and selected most simply to ½. As known well, the frequency dividing circuit of the frequency dividing ratio ½ can be constituted by a binary counter of single stage. It is usually favorable that a binary counter is used as a frequency dividing means Di and hence the frequency dividing ratio is selected to reciprocal of the power of 2. As known well, however, the frequency dividing circuit may be constituted with the frequency dividing ratio being reciprocal of integer other than the power of 2 without complicating the circuit considerably.

The coincidence detecting circuit means Ci ($i=2\sim m$) are inserted between the frequency dividing circuit means Di ($i=1\sim m$) respectively. Specific constitution of the coincidence detecting circuit means is, for example, in one exclusive OR circuit (hereinafter referred to as "XOR") or exclusive NOR circuit (hereinafter referred to as "XOR") as shown in FIG. 1. Each coincidence detecting circuit means Ci is connected to two adjacent frequency dividing circuit means Di so that one input of the coincidence detecting circuit means Ci receives output of the front frequency dividing circuit means Di-1 and output of the coincidence detecting circuit means Ci is supplied to input of the rear frequency dividing circuit means Di. In such connection, the frequency dividing circuit means Di of m in number and the coincidence detecting circuit means Ci of (m−1) in number are connected in cascade connection. However, two frequency dividing circuit means need not always have one coincidence detecting circuit means inserted therebetween. Particularly, if the frequency dividing circuit means is connected in series to the final stage of the cascade connection circuit, a sort of counter circuit can be constituted, thereby the maximum countable value of the cascade connection circuit can be increased. In addition, the coincidence detecting circuit means need not be preset before the initial frequency dividing circuit means D1 of the cascade connection circuit shown to the left of FIG. 1.

Other input of the coincidence detecting circuit means Ci is supplied with digital data Ei ($i=2 \sim m$) representing the event occurrence through input circuit means Ii ($i=2 \sim m$) respectively. The first digital data I1 may be connected without interposition of the coincidence detecting circuit means through the input circuit means I1 directly to the initial frequency dividing circuit means D1 as shown in FIG. 1. The input circuit means Ii ($i=1-m$) may be merely a connecting wire in the most simple constitution, or various logical gates may be used as hereinafter described in the description of preferred embodiments. When logical gates in the latter case are used, a plurality of event occurrence data may be inputted to the gates, for example, the X data Eij ($j=1-R$) may be inputted to the input circuit means Ei. Output terminals Oi ($i=1-m$) to read the count value finally are drawn from output side of each frequency dividing circuit means Di of the midway of the cascade connection circuit and at the final stage, and outputs Qi ($i=1-m$) of each frequency dividing circuit means Di are read through these terminals during the reading. Frequency detecting circuit means Di are provided with reset inputs R respectively, and common reset pulse RP is supplied to these inputs R simultaneously at the count starting by the circuit of the invention.

In the circuit of the invention constituted as above described, if any two among the m event occurrence data Ei are not produced simultaneously, a plurality of event occurrence data Ei ($i=1 \sim m$) are counted independently to each other and accurately with weight Wi ($i=1 \sim m$) specified by following formula.

$$Wi = N1 \cdot N2 \cdot \ldots \cdot Ni - 1 \quad (1)$$

Wherein, Wi=1. That is, regarding one frequency dividing circuit means Di, when the event occurrence data Ei of Ni in number are supplied through the coincidence detecting circuit means Ci preset thereto, since the frequency dividing ratio is 1/Ni, one pulse is generated as output Qi and transmitted to next frequency dividing circuit means Di+1. On the contrary, the frequency dividing circuit means Di also receives output Qi-1 from the front frequency dividing circuit means Di-1, and one of the outputs Qi is equivalent to the output Qi-1 of Ni in number from the front stage. In other words, one output Qi has weight equivalent to that of the output Qi-1 of Ni in number of the front stage, and it is understood from this relation that formula (1) applies.

However, above description means that, if the event occurrence data Ei of the existing stage i and the event occurrence data Ei-1 of the front stage i - 1 are produced at the same time rate, the pulse width of the output Qi-1 from the front stage becomes Ni times of the pulse width of the output Qi of the existing stage. Consequently, the event occurrence data Ei to the existing stage may be produced during the pulse generating of the output Qi-1 from the front stage. In the circuit of the invention, however, since the frequency dividing circuit means Di receives the output Qi-1 of the front stage and the event occurrence data Ei to the existing stage through the coincidence detecting circuit means Ci having coincidence detecting function, as described hereinafter, the event occurrence data Ei is received without interference by whether the output Qi-1 from the front stage is produced or not, and then the number of occurrence times can be counted accurately. Accordingly, the circuit of the invention can count the number of occurrence times of the occurrence data Ei ($i=1 \sim m$) from plural events with weighting represented by the formula (1) and totalize the count value accurately. Assuming that the number of occurrence times of each event occurrence data Ei be Mi ($i=1 \sim m$), the total value M is represented by following formula.

$$M = \sum_{i=1}^{i=m} W_i \cdot M_i \quad (2)$$

In order that the basic operation of the circuit of the invention summarized in the formulae (1) and (2) can be understood easily, the most simple example will be shown in FIGS. 2 through 3. In an example shown in FIG. 2, any of five frequency dividing circuit means D1~D5 is a binary counter of single stage having the frequency dividing ratio ½, and any of four coincidence detecting circuit means C2~C5 between the frequency dividing circuit means D1~D5 respectively is XOR gate and other inputs of the two XOR gates C4, C5 at the right among the four gates are grounded, i.e., supplied always with logical value "0". Consequently, these XOR gates C4, C5 are opened only when input to one of the gates C4, C5 takes logical value "1". In other words, these gates C4, C5 act merely as connecting wires, thereby the frequency dividing circuit means D3~D5 constitute a binary counter of three stages. The three event occurrence data E1, E2, E3 are supplied to the initial frequency dividing circuit means D1 and the XOR gates C2, C3 respectively, and the numbers of occurrence times M1, M2, M3 are 5, 2, 3 respectively as shown in FIG. 3.

Assuming that other inputs of the XOR gates C2, C3 are also grounded, the frequency dividing circuit means D1~D5 constitute a binary counter of five stages, and the outputs Q1~Q5 have weights W1~W5 increasing with the power of 2 shown in lower side as known well. In order to take connection to the weighting, if weight to the first event occurrence data E1 is made 1, weight of the event occurrence data E1~E3 coincides with weight of output of each stage of the binary counter. In this example, the event occurrence data E4, E5 may be assumed not to be produced for convenience. Three intermediate lines in FIG. 3 represent output state of the outputs Q1~Q5 when the event occurrence data E1~E3 are individually produced five times, two times and three times respectively, and the lowermost line of FIG. 3 represents output state of the outputs Q1~Q5 when these event occurrence data E1~E3 are all produced. In the circuit of the invention, since two inputs to the XOR gate do not interfere with each other as above described, output distribution of the outputs Q1~Q5 at the lowermost line of FIG. 3, i.e., number 21 in decimal notation in this example, is expressed in binary notation by addition of three numbers in binary notation representing the output distribution of the outputs Q1~Q5 shown in the three intermediate lines. The most right-hand line of FIG. 3 expresses these numbers in decimal notation.

It is understood from the above description that the circuit of the invention can accurately count and totalize the number of occurence times of plural events with weighting corresponding to respective events. It is assumed in describing the basic principle that any two of the plural events do not occur simultaneously, but if this assumption does not apply, logical gates may be used in the input circuit means Ii ($i=1\sim m$) of FIG. 1 and be enabled in prescribed sequence by scanning clock pulses thereby the assumed condition can be assured. Preferred embodiments of the invention including such input circuit means will be hereinafter described.

Other objects and features of the invention will be better understood from the following description taken in connection with the accompanying drawings.

BRIEF DESCRIPTION OF THE DRAWINGS

FIGS. 1 through 11 show content of the invention;

FIG. 1 is a circuit diagram illustrating basic constitution of a weighted event counting circuit according to the invention;

FIG. 2 is a circuit diagram of an example of the basic constitution of FIG. 1;

FIG. 3 is a diagram illustrating operation of the example of FIG. 2;

FIG. 4 is a circuit diagram of main part of a first embodiment where exclusive OR gate is used as coincidence detecting circuit means;

FIG. 5 is a waveform chart of main signals illustrating operation of the first embodiment;

FIG. 6 is a circuit diagram of main part of a second embodiment where exclusive NOR gate is used as coincidence detecting circuit means;

FIG. 7 is a waveform chart of main signals illustrating operation of the second embodiment;

FIG. 8 is a circuit diagram of main part of a third embodiment where logical gate is used as input circuit means and a plurality of event occurrence data are inputted;

FIG. 9 is a circuit diagram of main part of a fourth embodiment where clock pulse is also used in input to logical gate as input circuit means;

FIG. 10 is a waveform chart of main signals illustrating operation of the fourth embodiment where clock pulse is utilized for counting the duration of the event occurrence data;

FIG. 11 is a circuit diagram of input circuit means in a fifth embodiment where non-integers are assigned as weighting to the event occurrence data;

FIG. 12 is a diagram illustrating an example where the number of event occurrence times is counted by a counter; and FIG. 13 is a diagram illustrating an example where event occurrence signals are inputted to a counter through OR gate.

DESCRIPTION OF THE PREFERRED EMBODIMENTS

Figure 7:
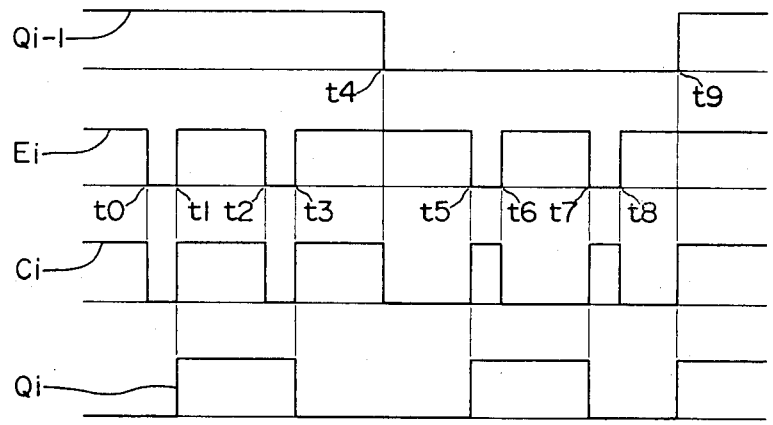

FIG. 4 shows a first embodiment of the invention where coincidence detecting circuit is XOR gate, and operation of the circuit is described referring to a waveform chart of FIG. 5. In FIG. 4, i-th coincidence detecting means $C_i$ and i-th frequency dividing circuit means $D_i$ are shown by sampling from FIG. 1. It is assumed in following description for simplification that the frequency dividing circuit means is a binary counter of one stage with frequency dividing ratio $\frac{1}{2}$, and the event occurrence data $E_i$ is signal expressing the occurrence of event as logical value "1". Also, output signal of the XOR gate $C_i$ is expressed by $C_i$, and state of output signal $Q_i$ of the frequency dividing circuit $D_i$ varies corresponding to rising of the output signal $C_i$.

The XOR gate $C_i$ is supplied at one input terminal with output signal $Q_{i-1}$ of the frequency dividing circuit $D_{i-1}$ at front stage, and the front output $Q_{i-1}$ is shown at upper side of FIG. 5. If the front output $Q_{i-1}$ is at state "1" as shown to the left of FIG. 5 and the two event occurrence data signals $E_i$ rising at time t0 and time t2 are inputted to the XOR gate $C_i$ as shown at lower side of FIG. 5, the output signal $C_i$ progresses in entirely reverse relation with respect to the event occurrence data signal $E_i$ as shown at lower side of FIG. 5. Output Q1 of the frequency dividing circuit $D_i$ varies from value "0" to value "1" and is transmitted to next stage at the time t1 when the XOR gate output $C_i$ rises corresponding to rising of i-th event occurrence data signal $E_i$. Also at the rising time t3 of the second event occurrence data $E_i$, the XOR gate output $C_i$ rises but the output $Q_i$ of the frequency dividing circuit $D_i$ varies from value "1" to value "0". This operation progresses similarly whatever times the event i occurs as long as the front output $Q_{i-1}$ is "1". Every time the event occurrence data $E_i$ is produced twice, the frequency dividing circuit $D_i$ transmits one output $Q_i$ to next stage.

If the front output $Q_{i-1}$ varies from value "1" to value "0" at the time t4, the XOR gate output $C_i$ varies from value "1" to value "0" corresponding to the variation of the front output $Q_{i-1}$. However, since the frequency dividing circuit does not respond to descending of the XOR gate output $C_i$, state of the output $Q_i$ of the frequency dividing circuit $D_i$ does not vary. If the front output $Q_{i-1}$ is value "0" and the event occurrence data signal $E_i$ is generated twice as shown in FIG. 5, since the XOR gate output $C_i$ progresses in the same relation as the event occurrence data $E_i$ as shown in FIG. 5, state of the frequency dividing circuit output $Q_i$ varies at the rising of the XOR gate output $C_i$, i.e., at the rising time t5, t7 of the event occurrence data $E_i$. This case is different from the previous case in that the frequency dividing circuit output $Q_i$ varies at the rising of the event of the event occurrence data $E_i$ or at the descending thereof. However, the former is similar to the latter in that every time the event occurrence data $E_i$ is generated twice the frequency dividing circuit output $Q_i$ is generated once even when the front output $Q_{i-1}$ is value "0".

If the front output $Q_{i-1}$ varies from value "0" to value "1" at the time t9, that is, if the XOR gate $C_i$ receives the counting input from the front stage, the output $C_i$ of the XOR gate $C_i$ rises from value "0" to value "1" and corresponding to the variation the output $Q_i$ of the frequency dividing circuit $D_i$ varies from value "0" to value "1" in the example shown in FIG. 5 thereby the counting input $Q_{i-1}$ from the front stage is counted. In the example, state of the frequency dividing circuit output $Q_i$ immediately before the time t9 varies from value "1" to value "0" corresponding to the rising of the input $Q_{i-1}$ from the front stage thereby the output $Q_{i-1}$ of the front stage is counted.

As above described, if any event does not occur simultaneously, that is, if generation of the event occurrence data Ei and state variation of the front output Qi-1 do not take place simultaneously in the embodiment, the event occurrence data Ei and the front output Qi-1 do not interfere with each other but operate the frequency dividing circuit Di. The mutual non-interference of the two inputs to the XOR gate Ci is based on that output state of the XOR gate Ci varies only depending on whether the two outputs are coincident or not as clearly understood from the above description.

Of course, operation of detecting whether the two inputs are coincident or not can be achieved not only by the XOR gate in FIG. 4 but also by other circuit means, for example, $\overline{XOR}$ gate Ci shown in FIG. 6. FIG. 7 is a waveform chart illustrating operation of the circuit of the embodiment where the $\overline{XOR}$ gate Ci is used as a coincidence detecting circuit. It is clear from comparison that FIG. 7 is different from FIG. 5 only in expression of event occurrence in the event occurrence data Ei by logical value "0". When event occurrence is expressed by logical value "1" as in the first embodiment, one inverter may be used as an input circuit means Ii in FIG. 1. Although state of the output Qi of the frequency dividing circuit Di varies at the rising of input thereto in description of any of both embodiments, it is clear that similar operation to above description can be obtained by using the frequency dividing circuit means acting at the input descending if an inverter is preset before the input.

Figure 8:
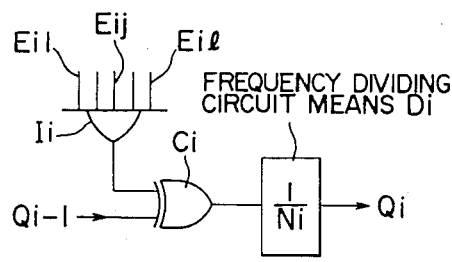

FIG. 8 shows another embodiment where OR gate is used as an input circuit means Ii. The OR gate Ii corresponds to the case where the XOR gate is used in a coincidence detecting circuit means Ci as shown in FIG. 8. In this embodiment, a plurality of event occurrence data Eij ($j=1-l$) can be inputted to the OR gate Ii. As clearly understood, these event occurrence data Eij are supplied with equal weight Wi. If $\overline{XOR}$ gate is used in the coincidence detecting circuit means Ci, of course, the input circuit means Ii must be changed correspondingly to this. AND gate may be used when event occurrence is expressed by value "0" in the event occurrence data Ei, and NAND gate may be used when it is expressed by value "1".

As previously described in FIG. 2, fixed logical value is supplied to the event occurrence data input of the coincidence detecting circuit Ci, thereby action of the coincidence detecting circuit means Ci is disabled in some meaning and the frequency dividing circuit means Di-1 and Di disposed respectively at front side and rear side of the coincidence detecting circuit means Ci can be connected in series. The fixed logical value to be supplied in this case is "0" when the coincidence detecting circuit means Ci is XOR gate, and "1" when it is $\overline{XOR}$ gate as shown in FIG. 2.

Figure 9:
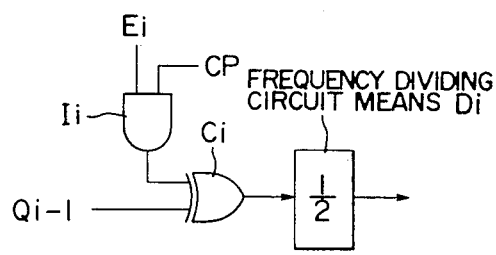

In another useful embodiment of the invention, logical gate is used in the input circuit means Ii thereby not only the event occurrence data but also a clock pulse are inputted to the input circuit means Ii. FIG. 9 shows an example of this embodiment, where AND gate is used as input circuit means Ii when the coincidence detecting circuit Ci is XOR gate, and the event occurrence data Ei and the clock pulse CP are inputted to the input circuit means Ii. When scanning clock pulse is used as clock pulse CP as above described, even if some data take place simultaneously among the m event occurrence data Ei ($i=1 \sim m$), these data can be sequenced and taken into the cascade connection circuit shown in FIG. 1. That is, if the scanning clock pulse CP are supplied respectively to the m input circuit means Ii ($i=1 \sim m$) of the cascade connection circuit in prescribed sequence so that the clock pulses CP are not overlapped, the m event occurrence data Ei ($i=1 \sim m$) supplied to the coincidence detecting circuit means Ci ($i=2 \sim m$) and the initial frequency dividing circuit meand D1 through these input circuit means so that any two data among the m event occurrence data Ei are not overlapped simultaneously.

Figure 10:
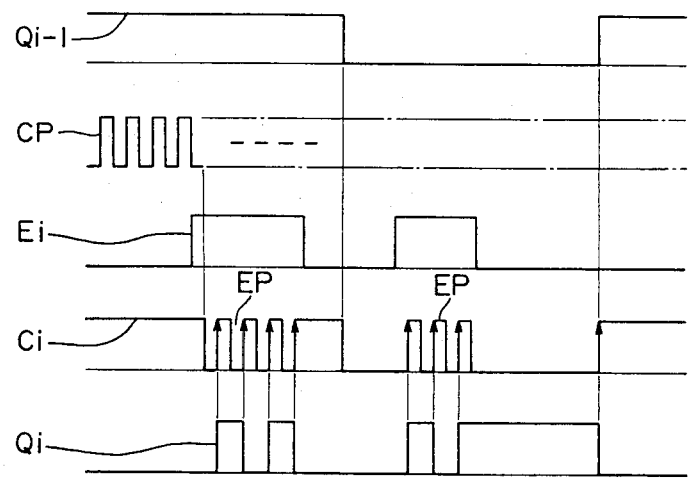

FIG. 10 is a waveform chart of the circuit of FIG. 9 where period of the clock pulse CP is made sufficiently shorter than duration of the event occurrence data so that the duration can be measured or counted. Since FIG. 10 shows similar operation content to that of FIG. 5, it will now be described briefly. The event occurrence data Ei at the left of FIG. 10, which is produced when the front output Qi-1 is at state "1", is converted during the duration into four event occurrence data pulses EP cut by the clock pulses CP shown at upper side, and represented as four negative pulses in the output Ci of the coincidence detecting circuit means shown at lower side. State of the output Qi of the frequency dividing circuit means Di varies at every rising of the four pulses thereby the frequency dividing circuit means Di outputs the count value 4. The event occurrence data Ei at the right, which is produced when the front output Qi-1 is at state "0", is converted into three event occurrence data pulses EP, and the output Ci of the coincidence detecting circuit means in this case is represented as positive pulses without conversion and corresponding to the positive pulses the output Qi of the frequency dividing circuit means Di varies as shown in FIG. 10 thereby the frequency dividing circuit means Di outputs the count value 3.

The measuring or counting of the duration of the event occurrence data Ei is useful in that the time of the plural event occurrence data Ei at state "1" or at state "0" is counted and totalized with weighting per each event, and that, when the plural event occurrence data Ei are a series of data transferred by a transfer clock, the clock pulses CP are generated in synchronization with the transfer clock thereby the number of data being "1" or "0" among the event occurrence data as serial transfer data is counted with weighting.

Figure 11:
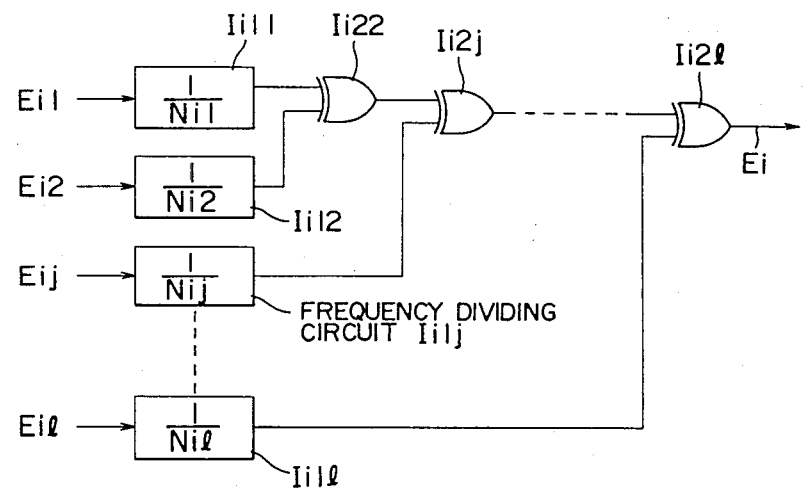
Figure 12:
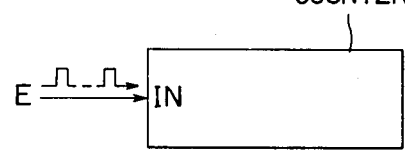
FIG. 12 and FIG. 13 show the prior art.
Figure 13:
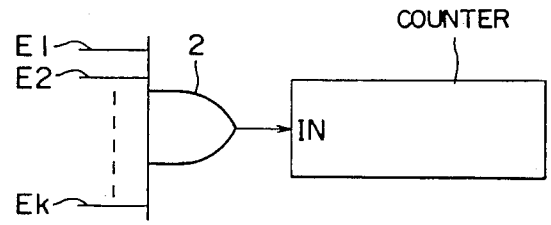

Regarding the weight Wi given to i-th event occurrence data Ei as previously described in formula (1), since the frequency dividing circuit means up to the front stage usually have the frequency dividing being reciprocal of integer, the weight Wi as product of the frequency dividing scale factors N1, N2, . . . , Ni-1 is also restricted to integer value. However, if the frequency dividing circuit having the suitable frequency dividing ratio is adopted as input circuit means Ii, the weight Wi can be selected to non-integer value. If the frequency dividing ratio in the input circuit means is designated by N, it is clearly understood that the weight becomes Wi/N. FIG. 11 shows an embodiment in this case. In the embodiment, the i-th event occurrence data Ei is further classified into the l event occurrence data Eij ($j=1 \sim l$), and the data Eij are inputted to the frequency dividing circuits Ii1j ($j=1 \sim l$) having the frequency dividing ratios 1/Nij ($j=1 \sim l$) respectively. Outputs of these frequency dividing circuits Ii1j are coupled by the XOR gates Ii2j ($j=2 \sim l$) of ($l-1$) in number and made the i-th event occurrence data Ei, but these XOR gates may be assumed as one OR gate in the operation. That is, output from any one of the frequency dividing circuits Iilj becomes the event occurrence data Ei, but the event occurrence data Ei is not generated from any two of the frequency dividing circuits Iilj simultaneously on account of the coupling by the XOR gate group. In the embodiment, if weights to the l event occurrence data Eij ($j=1\sim l$) are designated by Wij ($j=1\sim l$) respectively, following formula applies.

$$Wij = Wi/Nij \qquad (3)$$

The circuit of the invention may be performed in various modifications in addition to the above embodiments. For example, combination of a plurality of cascade connection circuits each including the frequency dividing circuit means and the coincidence detecting circuit means is possible. As an example in this case, even if output from the final stage of the plural cascade connection circuits is received by the initial stage of other cascade connection circuit, the count value can be transmitted to other cascade connection circuit as long as timing of the signal transmission is taken at the junction. Although reading means of the count value stored in one cascade connection circuit is parallel reading from each stage in the above description, known means as data reading of counters may be also used in the reading. Furthermore, the frequency dividing circuit means need not always have fixed frequency dividing ratio, but the frequency dividing ratio may be changed by known suitable means so as to change the weighting to each event occurrence data.

The weighted event counting circuit according to the invention may be composed of relatively simple circuit constituting means as clearly seen from the basic constitution diagram. That is, the weighted event counting circuit comprises a plurality of frequency dividing circuit means, a plurality of coincidence detecting circuit means each inserted and connected between the two adjacent frequency dividing circuit means and having one input receiving output of the front frequency dividing means and supplying its output to the rear frequency dividing circuit means, said frequency dividing circuit means and said coincidence detecting circuit means constituting a cascade connection circuit, and input circuit means each supplying other input of the coincidence detecting circuit means with digital data representing the event occurrence to be counted every time the event occurs. Since any means can be easily enclosed within the semiconductor integrated circuit, according to the invention, the number of occurrence times of plural events can be counted and totalized with weighting specified per each event using a simple constitution suitable for the integration.

According to the invention, a weighted count totalizing circuit can be enclosed in a quite limited area within a semiconductor chip into compact constitution although assembling of a microprocessor is required in the prior art. Consequently, the circuit of the invention is particularly suitable for the integration in so-called custom IC to be assembled in portable apparatuses and devices On the other hand, as clearly understood from the description of the embodiments, since the circuit of the invention has degree of freedom for the designing in operation parameters, it can be performed in various modifications corresponding to required specification. Accordingly, the circuit of the invention can meet the wide applications or requirements and therefore contribute to the development of the electronic industry.

What is claimed is:

1. A weighted event counting circuit comprising:
   first frequency dividing means for receiving a first occurrence signal corresponding to one of a plurality of events to be counted, for frequency dividing the received signal, and for outputting the resulting frequency divided signal;
   coincidence detection circuit means, having a first and a second input terminal and an output terminal, for receiving at one input terminal thereof said frequency divided signal from said first frequency dividing circuit means and receiving at the other input terminal thereof a second occurrence signal, corresponding to another of said plurality of events to be counted, and for detecting the coincidence of said frequency divided signal and said second occurrence signal;
   second frequency dividing circuit means for receiving an output from said coincidence detection circuit means output terminal and for frequency dividing the received output;
   input circuit means for asynchronously supplying each occurrence signal of said plurality of events to the particular one of said frequency dividing circuit means corresponding in position to a weight of each event independent of other occurrence signals supplied to other input circuit means, directly as a result of the occurrence of the event and independent of any clock signal; and
   a plurality of output means each connected to the output of one of said frequency dividing circuit means for generating a plurality of weighted event counting values, the weight assigned to each event corresponding to the relative position of the particular frequency dividing circuit means.

2. A weighted event counting circuit comprising:
   A. a plurality of cascade connection circuits, connected in cascade, each of said cascade connection circuits including:
      (1) coincidence detection circuit means, having a first and a second input terminal and an output terminal, for receiving at one input terminal thereof a first occurrence signal corresponding to one of a plurality of events to be counted and receiving at the other input terminal thereof a second occurrence signal corresponding to another of said plurality of events, and for detecting the coincidence of said first occurrence signal and said second occurrence signal; and
      (2) frequency dividing circuit means for receiving an output from said coincidence detection circuit means output terminal and for frequency dividing the received output;
      (3) wherein one of the occurrence signals received at one of the terminals of said coincidence detection circuit means is the frequency divided output of a frequency dividing circuit means of a preceding stage cascade connection circuit;
   B. input circuit means for asynchronously supplying each occurrence signal of said plurality of events to one of said frequency dividing circuit means corresponding in position to a weight of each event independent of other occurrence signals supplied to other input circuit means, directly as a result of the occurrence of the event and independent of any clock signal; and C. a plurality of output means each connected to an output terminal of one of said frequency dividing circuit means for generating a plurality of weighted event counting values, the weight assigned to each event corresponding to the relative position within the cascade of the particular frequency dividing circuit means.

3. A weighted event counting circuit as set forth in claim 2, wherein said first input terminal of coincidence detection circuit means is connected to an output terminal of a first stage frequency dividing circuit means for receiving said first occurrence signal and for frequency dividing the received signal.

4. A weighted event counting circuit as set forth in claim 1, 2 or 3, further comprising means for generating clock pulses and wherein said occurrence signals are generated in synchronism with said clock pulses.

5. A weighted event counting circuit as set forth in claim 1, 2 or 3,
further comprising a plurality of frequency dividing circuit means, each having at least one input and one output, and
wherein at least one of said first and second occurrence signals is generated by connecting, by means of a logical gate, said outputs of said plurality of frequency dividing circuit means to one of said input terminals of said coincident detection circuit means,
said at least one input of each of said plurality of frequency dividing circuit means receiving an occurrence signal from one of said plurality of events.

6. A weighted event counting circuit as set forth in claim 1, 2 or 3, wherein at least one of said frequency dividing circuit means is a binary counter.

7. A weighted event counting circuit as set forth in claim 1, 2 or 3, wherein said coincidence detection circuit means is an exclusive OR gate.

8. A weighted event counting circuit as set forth in claim 1, 2 or 3, wherein said coincidence detecting circuit means is an exclusive NOR gate.

9. A weighted event counting circuit as set forth in claim 4 wherein at least one of said frequency dividing circuit means is a binary counter.

10. A weighted event counting circuit as set forth in claim 4 wherein said coincidence detection circuit means is an exclusive OR gate.

11. A weighted event counting circuit as set forth in claim 4 wherein said coincidence detecting circuit means is an exclusive NOR gate.

12. A weighted event counting circuit as set forth in claim 5 wherein at least one of said frequency dividing circuit means is a binary counter.

13. A weighted event counting circuit as set forth in claim 5 wherein said coincidence detection circuit means is an exclusive OR gate.

14. A weighted event counting circuit as set forth in claim 5 wherein said coincidence detecting circuit means is an exclusive NOR gate.

15. A weighted event counting circuit as set forth in claim 6 wherein said coincidence detection circuit means is an exclusive OR gate.

16. A weighted event counting circuit as set forth in claim 6 wherein said coincidence detecting circuit means is an exclusive NOR gate.

* * * * *